Aug. 18, 1936.　　　E. S. PATCH　　　2,051,458
LUBRICATING ELEMENT
Filed July 21, 1933
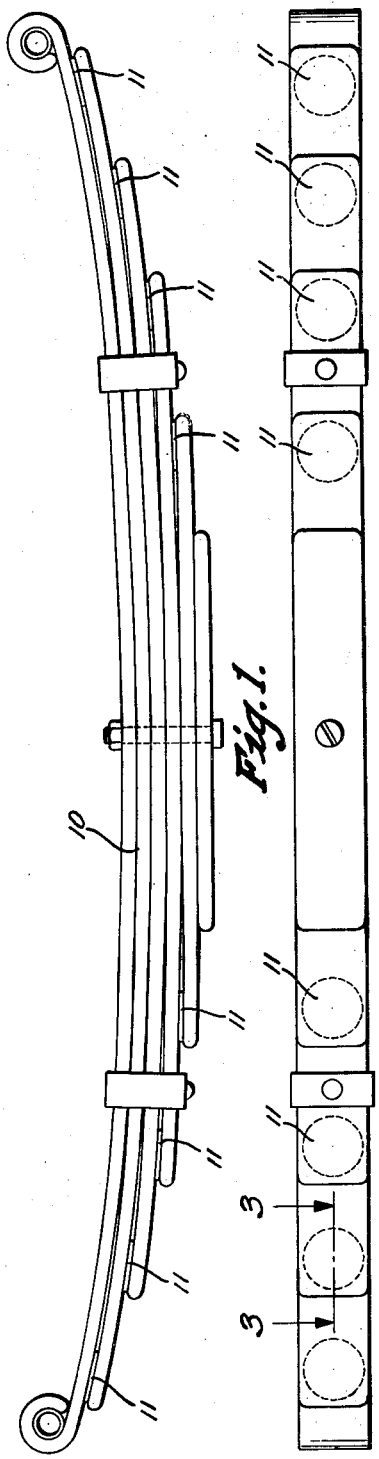
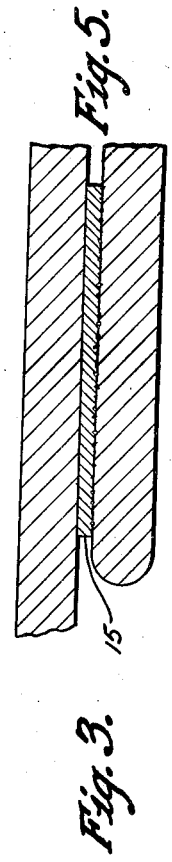
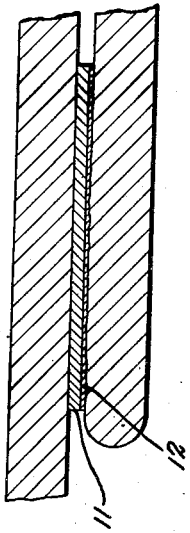
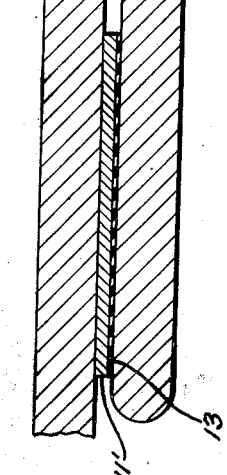
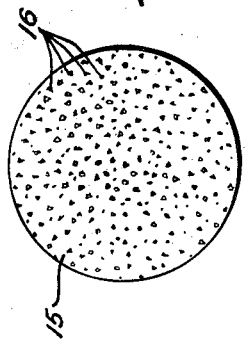
INVENTOR
Earl S. Patch
BY
Spencer Hardman Fehr
HIS ATTORNEYS Patented Aug. 18, 1936

2,051,458

UNITED STATES PATENT OFFICE 2,051,458

LUBRICATING ELEMENT

Earl S. Patch, Dayton, Ohio, assignor, by mesne assignments, to General Motors Corporation, Detroit, Mich., a corporation of Delaware Application July 21, 1933, Serial No. 681,443

6 Claims. (Cl. 267—49)

This invention relates to a self-lubricating wear plate adapted to be inserted between two relatively sliding parts, such as between two leaves of a multiple leaf spring, and thereby provide a very simple and efficient lubricating means therefor.

Similarly functioning wear plates for multiple leaf springs are now well-known but in all prior devices, so far as applicant knows, the wear plate is fixed against sliding on one of the spring leaves by a lug on the wear plate cooperating with a recess in the spring leaf, or by an equivalent device. Such prior constructions necessitate a specially modified spring leaf which increases the cost thereof, weakens the spring leaf, and/or practically prevents the use of the wear plate as an added accessory to old leaf springs now in use.

A feature of the wear plate of this invention is the construction thereof whereby no modification of the spring itself is necessary to permit its use therewith, and hence this invention may be readily applied as an accessory to the leaf springs of automobiles now in use.

Another feature is the extremely low cost of manufacture and assembling upon the spring of the device of this invention.

Further objects and advantages of the present invention will be apparent from the following description, reference being had to the accompanying drawing, wherein a preferred embodiment of one form of the present invention is clearly shown.

In the drawing:

Fig. 1 is a side elevation of an ordinary automobile leaf spring with the wear plates of this invention applied thereto.

Fig. 2 is a bottom view of Fig. 1 and shows in dotted lines the contours of the wear plates.

Fig. 3 is a section on line 3—3 of Fig. 2 and shows in exaggeration one form of the invention wherein a soft metal facing on a porous metal wear plate conforms itself to the minute surface irregularities in the spring leaf and thereby provides a high friction engagement therewith.

Fig. 4 is similar to Fig. 3 but shows a second form of the invention wherein the wear plate is retained in place by high friction upon the lower leaf by a non-metallic adhesive coating applied to the wear plate before it is inserted in place.

Fig. 5 shows a third form of the invention wherein the lower surface of the wear plate has finely divided hard abrasive particles such as carborundum partially embedded therein and serving to bite into the surface of the spring leaf and thereby provide a high friction engagement therewith.

Fig. 6 is a face view of the wear plate of Fig. 5 and illustrates, more or less diagrammatically, the irregular abrasive particles partially projecting from the lower surface of the wear plate.

Similar reference characters refer to similar parts throughout the several views.

Numeral 10 designates an ordinary multiple leaf spring such as are used as the main springs of present day automobiles. The wear plates 11 of this invention are simply inserted between contacting leaves wherever desired, such as near the ends of each of the leaves below the top leaf as shown in Figs. 1 and 2. In the spring shown the shortest leaf is not provided with the wear plates since due to its short length there will be very little relative sliding between it and its next adjacent leaf.

In all forms of the invention shown in Figs. 3, 4 and 5 the wear plate 11 is preferably made of a suitable self-lubricating lubricant-impregnated porous metal made by briquetting the suitable powder ingredients and then sintering the briquette to alloy the metal powders together. An example of making a porous bronze material suitable for the material of the wear plates 11 of this invention is disclosed in Patent No. 1,642,347, issued September 13, 1927 to Williams et al. Automobile spring leaves are often rolled so as to have slightly concave upper and lower surfaces in transverse section. In such cases preferably the wear plate 11 is made correspondingly slightly convex in transverse section so as to provide an even bearing pressure over the entire upper and lower areas of the wear plates 11, whereby said bearing plates are more efficiently retained in place by the devices of this invention.

In the form of the invention shown in Fig. 3, a lubricant-impregnated porous bronze metal disc 11 is faced on one side thereof with a facing 12 of softer metal such as zinc, lead, tin, antimony, copper, or some soft alloy of such metals. This facing 12 of softer metal may be sprayed on the porous bronze plate 11 with a suitable molten metal spray gun, whereby the softer metal is firmly bonded to plate 11 and the facing 12 is provided with a quite rough and irregular outer surface due to such spraying. Now when this composite wear plate is inserted between two leaves of an automobile leaf spring the pressure exerted thereupon will cause the soft metal facing 12 to flow to some extent and conform itself to the irregularities normally present in the surface of the leaf and thereby obtain a high friction hold or grip thereupon. Since the opposite side of the wear plate 11 presents a much lower friction rubbing surface to its overlying leaf all the relative sliding between these two leaves will occur between the self-lubricated surface of the wear plate 10 and its contacting leaf and thus the wear plate will be retained in its proper position between the two leaves without any additional retaining means. As stated above, such a wear plate may be readily inserted between the leaves of the main springs of automobiles now in use without any modification of the spring leaves themselves.

In the form of the invention shown in Fig. 4, the self-lubricated wear plate 11' has a lower facing 13 of a suitable higher-friction non-metallic material, such as semi-hard rubber, celluloid or similar cellulose-nitrate compound having a suitable plasticizer incorporated therein to render it more tough and adhesive to metal, or a phenol and formaldehyde condensation product having tough and adhesive properties. These non-metallic facings 13 function similarly to the soft metal facing 12 of Fig. 3, that is, they constitute a higher friction lower surface on the composite wear plate and thus retain the wear plate against slipping relative to its lower contacting leaf.

In the form of the invention shown in Figs. 5 and 6, a plain flat lubricant-impregnated porous bronze wear plate 15 has small irregular-shaped particles of a suitable abrasive partially embedded in one surface thereof so that the abrasive particles will be anchored in place but will have a large number of sharp corners 16 projecting from the surface. A suitable abasive material is crushed carborundum or glass particles which will pass through a 100 mesh sieve. This abrasive material may be partially embedded in the surface of the porous bronze wear plate 15 by suitable pressure, as by sifting the abrasive upon the wear plate just prior to passing it between suitable steel rollers. The resulting projecting sharp corners 16 of the abrasive particles will provide a high friction surface on one side of the wear plate 15 by their tendency to bite down into the steel surface of the spring leaf and thus form their own gripping recesses therein. In this form of the invention preferably a hard stiff grease is packed about each wear plate to prevent broken off particles of the hard abrasive from getting between relatively sliding contacting parts of the leaf spring or other bearings.

While the forms of embodiment of the present invention as herein disclosed, constitute preferred forms, it is to be understood that other forms might be adopted, all coming within the scope of the claims which follow.

What is claimed is as follows:

1. A lubricant-impregnated porous metal wear plate adapted to be inserted between two leaves of a multiple leaf spring, one of the surfaces of said wear plate having finely divided hard abrasive particles anchored therein and serving to form a high friction surface thereupon to retain said wear plate substantially fixed relative to one of the spring leaves.

2. A lubricant-impregnated porous metal wear plate adapted to be inserted between two leaves of a multiple leaf spring, one of the surfaces of said wear plate having irregular shaped carborundum particles partially embedded therein and serving to engage a plain hardened steel surface with high friction when pressed thereupon.

3. A relatively anti-friction metal wear plate adapted to be inserted between two leaves of a multiple leaf spring, one of the faces of said wear plate having a relatively soft metal coating surface-bonded thereupon.

4. A relatively hard anti-friction metal wear plate adapted to be inserted between two leaves of a multiple leaf spring, the non-slipping face of said wear plate having a rough-surface coating of relatively soft metal bonded thereto, said rough-surface coating being such as to flow by pressure and conform to minute irregularities in the surface of the spring leaf and thereby provide high friction engagement.

5. A relatively hard porous metal wear plate for insertion between two leaves of a multiple leaf spring, one of the porous metal faces of said wear plate having a relatively soft metal coating bonded to the porous metal surface by a flow of said soft metal into the pores thereof.

6. An anti-friction metal wear plate for insertion between two leaves of a multiple leaf spring, one of the faces of said anti-friction metal plate having a rigid friction material fixed thereto by being partially embedded in the surface thereof.

EARL S. PATCH.